May 3, 1949.　　　　　D. E. SUNSTEIN　　　　　2,468,843
APPARATUS FOR ELECTRICALLY TESTING
AND CLASSIFYING RESISTORS

Filed April 10, 1945　　　　　　　　　　　　　2 Sheets-Sheet 2

INVENTOR.
DAVID E. SUNSTEIN
BY
ATTORNEYS

Patented May 3, 1949

2,468,843

UNITED STATES PATENT OFFICE 2,468,843

APPARATUS FOR ELECTRICALLY TESTING
AND CLASSIFYING RESISTORS

David E. Sunstein, Elkins Park, Pa., assignor to
Philco Corporation, a corporation of Pennsylvania Application April 10, 1945, Serial No. 587,487

3 Claims. (Cl. 209—81)

My invention relates to a mechanism for automatically testing the resistance value of resistors. In particular, it relates to a system which carries through the complete automatic testing of resistors and classifies them in accordance with their actual value of resistance.

Although the principle of this testing mechanism will be described with reference to mechanism for testing resistors, it can also be applied to testing of other components such as capacitors, tubes, etc.

According to my invention the resistors to be tested are placed into a hopper, and are then fed by a hair brush impeller through a feed block into the measuring location. Here a solenoid is so arranged to press the leads of the resistors onto the contacting plate of the measuring circuit.

The measuring circuit then performs the function of measuring the value of the resistors. This circuit performs its measurement by deciding within which limit of resistance the value of this resistor under test falls. In accordance with the finding of this resistance measuring unit, trap doors in a chute are set, so that when the resistor is released from the measuring position, it can drop down the chute and is caught by the proper trap door and directed into the collector box which corresponds to the resistance limit into which the resistor under test is classified by the measuring equipment.

As soon as the trap doors have been set by the measuring equipment, an ejector solenoid ejects the resistor under test from the testing position, and it drops down through the chute and into the proper collector box. As soon as this resistor has been ejected from the mechanism, the pressure of the resistors waiting to be tested in the feed slots forces the next resistor toward the stop plate.

As soon as this occurs the stop plate which is fitted with a limit switch causes the solenoid which presses the resistor into the contactor plates to again operate.

The measuring equipment measures this resistor, sets the trap doors and causes the ejector solenoid to operate. This operation is repeated, so that the device operates automatically to classify the resistors in accordance with certain resistance ranges.

Thus, all that is necessary for an operator to do is to feed resistors into the intake hopper and to empty the resistors out of the classification boxes when they become full. It is, of course, possible that the chutes which feed into the classification boxes could also be fed into marking machines, so that the resistors could be marked in accordance with their resistance value and tolerance as they come out of the measuring machine. Thus, as they came out of the machine, they would not only have been measured but they would have been marked with the value of resistance at the same time. This makes the entire process of passing and marking a completely automatic one and removes the possibilities of human error from the markings on such resistors.

Furthermore, it makes possible the much more rapid testing and marking of resistors and increases the output of a single operator.

Accordingly, an object of my invention is to provide a novel circuit arrangement for testing and for automatically classifying devices in accordance with the tests.

A further object of my invention is to provide a novel circuit arrangement for automatically admitting units to a test device, and automatic means for ejecting them from the test device upon completion of the test.

Still a further object of my invention is to provide a novel wholly automatic testing system.

These and other objects will appear in the detailed description to follow in connection with the drawings in which:

Figure 1a is a schematic showing of one of the operations;

Figure 4 is a side view of Figure 1.

Figure 1:
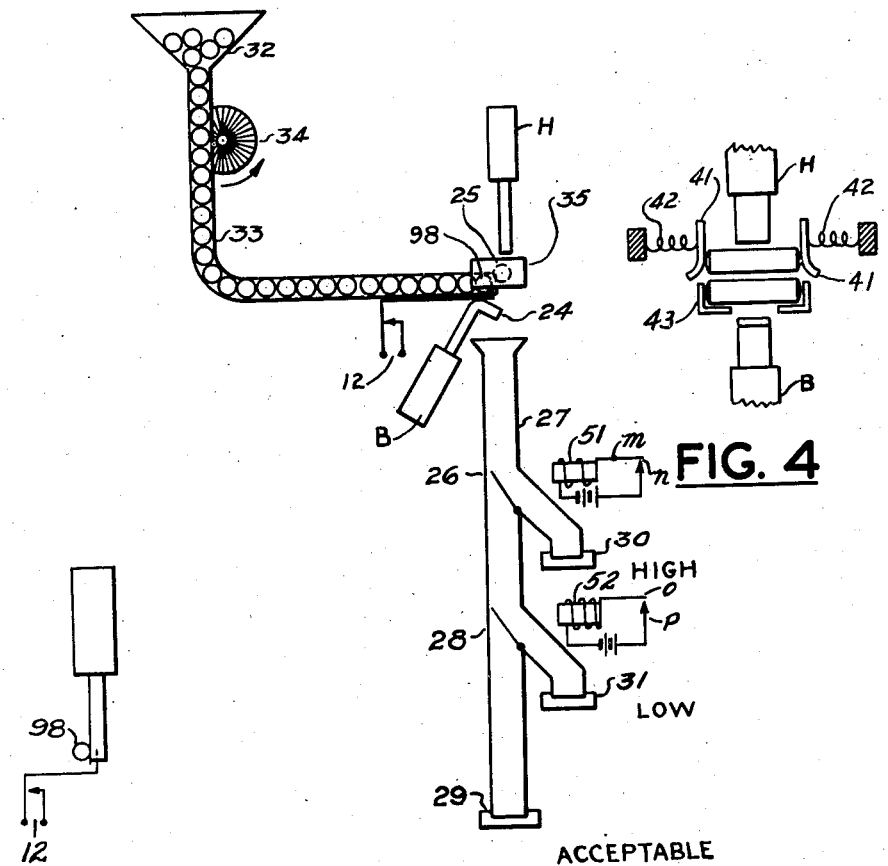
Figure 1 shows the schematic diagram of the mechanical elements of the system.
Figure 2:
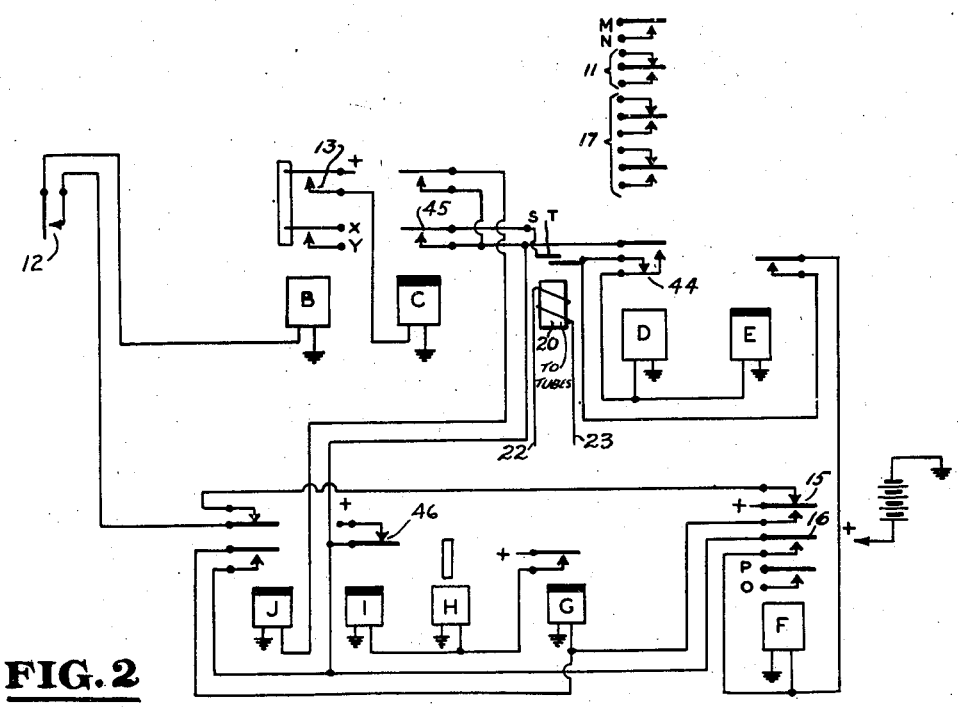
Figure 2 shows a diagram of some of the relay circuits of the system.
Figure 3:
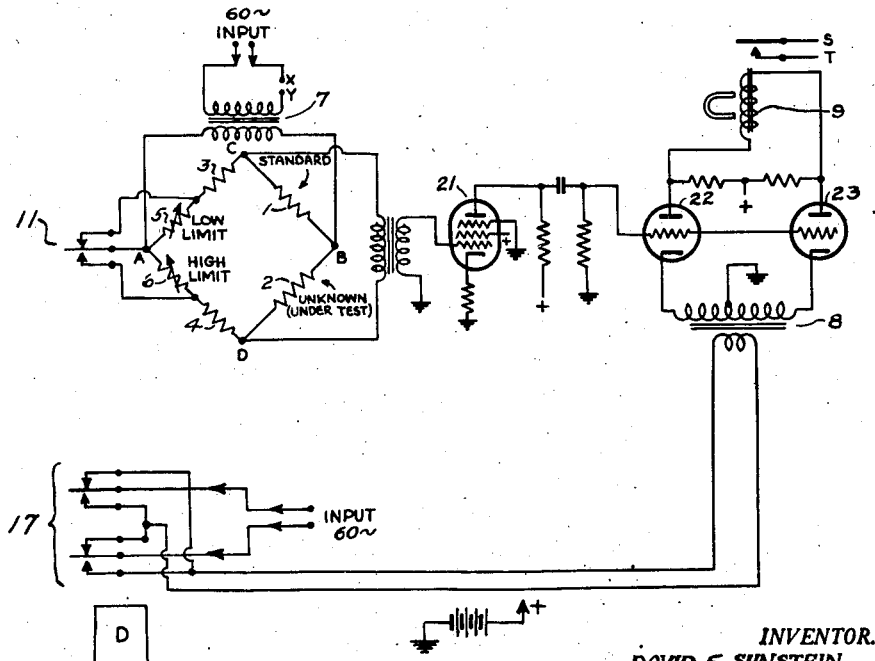
Figure 3 shows the measuring circuits in association with some of the relay contacts.

In Figure 1 is shown a mechanical system which will feed the resistors into a test jig, one at a time. An electrical testing apparatus, which may be as shown in Figures 2 and 3, is incorporated along with Figure 1 to perform the required tests upon the components in the test jig and thereafter to operate suitable doors in the throw-out chute of the system of Figure 1, according to the particular value of the component tested. Thus, as components are loaded into the hopper of Figure 1, they will be individually fed into the test fixture where they will be contacted and tested, and in accordance with the result of each test, each component will thereafter fall into one of the collector boxes.

The electrical means which performs the test for Figure 1 may be as shown in Figures 2 and 3.

In Figure 3 is shown a two-limit bridge comprising a standard resistor, 1, an unknown resistor, 2, two other resistors 3 and 4 which are preferably equal, and limit adjusting resistors 5 and 6. The bridge is excited at terminals AB from the secondary of the transformer 7. The output of the bridge is taken off at terminals CD. Connected across the output CD is a phase indicating circuit which compares the phase of the signal at terminals CD with the phase of the signal supplied to the bridge at terminals AB.

The method of operation of the bridge is as follows: Assume that the resistor under test has just been fed into the test jig. As will be shown later, the sequence system of Figure 2 will thereupon cause contacts XY in the primary circuit of transformer 7 (Figure 3) to be closed, thereby supplying signal to the bridge.

Relay D is deenergized at this instant of time. Accordingly, armature contact 11 engages its upper contacts, and the low limit adjustment resistor 5 of the bridge is shorted.

Resistor 6 has previously been set to the particular percentage tolerance of the component under test. That is, if the component under test is desired to be sorted into three boxes with one box containing components which fall within a given upper and lower limit, and the other two boxes containing components which fall below the lower limit and above the upper limit respectively, then resistors 5 and 6 are initially set at the particular percentage tolerances specified for the low and high limits respectively, and standard 1 is chosen as the center value for the component under test.

As soon as terminals XY are closed and current is supplied to the bridge, the output signal appearing at terminals CD will bear a particular phase relationship to the signal applied at terminals AB, dependent upon whether the unknown resistor 2 is below the high limit or above the high limit. If the unknown is at the critical value of the high limit, then the output at CD will be zero.

The phase discriminating circuit comprising tubes 21, 22 and 23 is capable of accurately determining whether the resistor 2 is below the high limit merely by comparing the phase of the signal at terminals CD with the phase of the signal supplied at terminals AB.

The phase discriminator shown functions as follows: the output of the bridge at terminals CD is fed through a suitable amplifier of conventional design, incorporating tube 21. Thence, the signal is supplied to the grids of the tubes 22 and 23. In the absence of signal on the grids of these two tubes, the plate currents of tubes 22 and 23 are alternatively biased to cut off by means of voltage induced in the secondary of transformer 8. The voltage fed to transformer 8 is from the same source as that used to supply the bridge at terminals AB.

The average plate currents of tubes 22 and 23, in the absence of signals at their grids will be equal. However, with signal at the grids, unbalanced plate current will be obtained with one of the tubes having a greater plate current than the other. This unbalanced plate current will cause a difference of average potential to appear at the plates of tubes 22 and 23. This unbalanced plate current operates a polarized relay 9. As the bridge is unbalanced in a given direction, relay 9 will be operated and the phasing may be so chosen that relay 9 operates if the unknown resistor 2 is below the high limit. If the resistor is above the high limit, the relay will not operate.

Non-operation of relay 9 when relay D is not energized thus indicates a reject whose value is too high. If relay D of Figure 3 is operated, then resistor 6 of the bridge is shorted so that the bridge will be capable of testing the unknown resistor 2 against the low limit standard, established by the setting of resistor 5. In order that relay 9 may still operate if the unknown resistor 2 is within limits, that is, above the low limit, the phase of the signal fed to transmformer 8 is reversed from the polarity employed for the high limit test, by means of phase reversing contacts 17 associated with relay D. Thus, non-operation of relay 9 when relay D is energized indicates a reject whose value is too low.

If the gain of the amplifier 21 is sufficiently great, relay 9 is actuated very critically with regard to whether the component is within limits or not. Furthermore, the operation of relay 9, which indicates whether the part is within limits, is not affected appreciably by the strength of the signal applied at terminals AB, nor by the gain of the amplifier. Thus, a very accurate check is insured, the accuracy of which depends primarily upon the accuracy of the standard impedance 1, and upon the arms 3 and 4, and to a lesser extent upon the limit settings of resistors 5 and 6.

The method of automatically setting the system of Figure 3 to check the unknown against one limit and then against the other limit is shown in Figure 2. Here a switch contact 12 closes by virtue of the pressure exerted thereon by the component 25 about to be tested, as soon as the component to be tested moves to the end of the feed line of Figure 1. As a result, an obvious energizing circuit is completed for the solenoid B which thereupon operates to move, as shown in Figure 1, the component 25 under test into test position. The unit to be tested is thus moved from its position on the tracks 43 (Figure 4) to its position between contacts 41 in the bridge circuit, which are spring pressed by springs 42. When energized, solenoid B is arranged to maintain contacts 12 closed and to mechanically block the next resistor 98 from travelling to the end of the feedline where contactor 12 is positioned.

Solenoid B also closes contacts XY in Figure 2, which as previously described starts the system of Figure 3 to test the component against the high limit.

If the component is within the high limit, relay 9 of Figure 3 energizes as above described, and contacts ST associated with this relay will be closed. Closure by solenoid B of an auxiliary set of contacts 13 of Figure 2 energizes a slow operating relay C. Energization of relay C completes an energizing circuit for relay D over its make before break contacts 44, closed contacts ST, armature 45 and its front contact of relay C, and armature 46 and its back contact of relay I.

Since contacts ST are closed, relay D reverses the operation of the bridge through contacts 11 and 17 as previously described in connection with Figure 3. That is to say, the high limit resistance is now shunted by contact 11, and the low limit resistance 5 is in circuit. At the same time, the phase of the signal to the cathodes of tubes 22 and 23 is reversed. The system is therefore set to perform a low limit test. Also, relay D through contacts MN operates a solenoid 51 in Figure 1, associated with the top door 26 along the chute 27 so as to permit the component to fall past this door.

At the same time that relay D is energized, relay E is also energized. This relay is a slow operating relay and so before it closes, the measuring circuit of Figure 3 has had time to measure the value of the resistor under test and likewise relay 9 has had an opportunity to close or remain open. Thus, when relay E closes, contacts ST are in the proper position, depending on the low limit measurement.

If contacts ST are still closed, indicating that the component is above the low limit established by resistor 5, an energizing circuit is completed for relay F over the closed contact of the armature of relay E and over the contacts ST and circuit traced above. Relay F operates a solenoid 52 in Figure 1, through contacts OP, thereby swinging the middle door 28 of Figure 1 to a position which will allow the component to fall straight by the door.

Operation of relay F, which thus occurs on the completion of the test, also opens contact 15, effecting a deenergization of solenoid B, thereby freeing the resistor under test. Relay F through contact 16 also operates a slow-acting relay G. Relay G activates the ejector solenoid H of Figure 1 which pushes the resistor out of the test jig, down into the chute, where it will fall to the bottom collector box 29, indicating that it is within both the high and low limits. While solenoid H is operated, resistor 98 is prevented from closing contacts 12 by virtue of the armature of the solenoid being disposed between resistor 98 and the stop limit contacts 12 as shown in Figure 1a.

Relay G also operates a slow-acting relay I. Opening of contacts associated with relay I removes the lock-in voltage supplied to relays D and F, thereby releasing the entire system including solenoid H. Release of solenoid H permits resistor 98 to close contacts 12. Reenergization of relay B when contacts 12 are closed will cause the next component 98 to move into the test position so that it may be tested in like manner.

If, in the above sequence, at the time relay C operates, contacts S and T are not closed, then relays D and E would not operate and hence relay J, which is a very slow-operating relay, and normally does not operate before the above described operations are completed, would have a chance to operate to perform the same function as relay F, that is, to release the entire system after having operated relay G, and ejector solenoid H. Thus, under this condition, if contacts S and T are not closed when relay C is operated, indicating that the component is above the high limit established by resistor 6, then the resistor will not be permitted to fall through to the bottom collector box of Figure 1, inasmuch as the solenoid associated with the top door 26 of Figure 1 will not have been operated because contacts MN will not have been closed. Thus, the resistor will fall into the top box 30 which is a high limit box.

Likewise, if contacts S and T are not closed at the instant of time that relay E operates in the first mentioned sequence above (indicating that the component is a low limit reject), relay F will not be operated. Hence, relay J will eventually operate, causing relay G and ejector solenoid H to operate and release the entire system. In this event, the component will fall into the middle collector box 31 of the chute of Figure 1 because the solenoid which operates the door associated with the second collector box 31 will not have operated, by virtue of contacts OP remaining open.

Thus, the system will function to cause the resistors to be accurately sorted into three groups, indicative of whether the component is above a high limit, between a high and low limit, or below a low limit.

Though the system has been described primarily with reference to resistor test, inductors or capacitors can be similarly checked. For example, in Figure 3, to measure inductors, it is only necessary to replace the standard resistor 1 by an inductor. If capacitors are to be measured, the standard should be replaced by a capacitor, and the positions of the standard 1 and the unknown resistor 2 should be interchanged so that "high" and "low" will refer to capacitance rather than to impedance.

It will be noted that alternative plans are possible. For example, instead of employing the two limit bridges of Figure 3, which enables testing the component for both high and low limits in one test jig, a system could be employed which placed the component in a test jig and there checks it (as by a single limit bridge) against one limit, whereafter, if the component proves, on the basis of said test, to be within said limit, it is moved into a second test position where it is checked (as by a second single limit bridge) against the other limit. Such alternative plans, however, generally result in greater complications than exist in the system of Figure 1, and hence are not as desirable.

My invention then provides the means for automatically classifying resistors in accordance with the resistance value which they have.

Resistors are fed into the hopper 32, are pushed along in feed chute 33 by a hair brush impeller 34 and arrive at the testing head 35.

The mechanism described above then goes into operation and the resistors are classified into boxes 29, 30 or 31 depending upon their resistance values. However, since this invention has many forms, I prefer the forms described by the following claims.

I claim:

1. In a device for testing and classifying devices, a bridge circuit having a low limit setting, a high limit setting; means for automatically admitting a device to be tested in said bridge circuit; switching means for setting said bridge at its low limit and high limit sequentially; a phase responsive device, means including said phase responsive device and said bridge and operative when each of said limits are set for testing whether said device under test is within, below or above the limit settings of said bridge; means for applying a source of alternating current to the input of said bridge; means for applying the output of said bridge to said phase responsive device; means for energizing said phase responsive device from the same input source of alternating current; and means for reversing said source with respect to said phase responsive device simultaneously with the switching of said bridge from one of its limit settings to the other limit setting.

2. In a device for testing and classifying devices, a bridge circuit having a low limit setting, a high limit setting, means for automatically admitting a device to be tested in said bridge circuit; switching means for setting said bridge at its low limit and high limit sequentially; a phase responsive device, means including said phase responsive device and said bridge and operative when each of said limits are set for testing whether said device under test is within, below or above the limit settings of said bridge; means for applying a source of alternating current to the input of said bridge; means for applying the output of said bridge to said phase responsive device; means for energizing said phase responsive device from the same input source of alternating current; and means for reversing said source with respect to said phase responsive device simultaneously with the switching of said bridge from one of its limit settings to the other limit setting; said phase responsive device including an electromagnet rendered operative if the device tested is below the high limit when the bridge is set for the high limit test and rendered operative if the device tested is above the low limit when the bridge is set for the low limit test.

3. In a device for testing and classifying devices, a bridge circuit having a low limit setting, a high limit setting, means for automatically admitting a device to be tested in said bridge circuit; switching means for setting said bridge at its low limit and high limit sequentially comprising an electromagnet having circuit connections for energizing said electromagnet when said device to be tested is ready for test, means controlled by said electromagnet for applying signals to the input of said bridge and for positioning said device for test; a phase responsive device connected to the output of said bridge; a grouping mechanism; an electromagnet having an energizing circuit operative if the test of said device indicates that said device is within the limit tested for setting said circuit for its alternate limit and a second electromagnet having an energizing circuit operative if the test of said device indicates that said device is within the second limit tested for terminating said test, means controlled by each of said last mentioned electromagnets for operating said grouping mechanism; an electromagnet having an energizing unit controlled by each of said limit controlling electromagnets for ejecting said device from said bridge circuit; means including said signal applying means and said bridge and operative when each of said limits are set for testing whether said device under test is within, below or above the limit settings of said bridge.

DAVID E. SUNSTEIN.

REFERENCES CITED

The following references are of record in the file of this patent:

UNITED STATES PATENTS

| Number | Name | Date |
| --- | --- | --- |
| 701,453 | Zellers | June 3, 1902 |
| 1,341,463 | Hazard | May 25, 1920 |
| 1,758,268 | Wagner | May 13, 1930 |
| 1,931,054 | Butterfield | Oct. 17, 1933 |
| 1,951,461 | Wilson | Mar. 20, 1934 |
| 2,293,502 | Hermann | Aug. 18, 1942 |

FOREIGN PATENTS

| Number | Country | Date |
| --- | --- | --- |
| 26,639 | Great Britain | 1912 |

OTHER REFERENCES

Publication by L. Podolsky in "Electronics", July, 1933, pages 180–181, copy in Scientific Library.